US009900464B2

(12) United States Patent
Hiraike (10) Patent No.: US 9,900,464 B2
(45) Date of Patent: Feb. 20, 2018

(54) INFORMATION PROCESSING APPARATUS AND CONTROL METHOD THEREFOR, AND NON-TRANSITORY COMPUTER-READABLE MEDIUM THAT OBTAINS AND SETS SEND DESTINATION INFORMATION USING A WEB BROWSER FUNCTION

(71) Applicant: CANON KABUSHIKI KAISHA, Tokyo (JP)

(72) Inventor: Kou Hiraike, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/091,823

(22) Filed: Apr. 6, 2016

(65) Prior Publication Data

US 2016/0301826 A1    Oct. 13, 2016

(30) Foreign Application Priority Data

Apr. 13, 2015    (JP) .................................. 2015-082059

(51) Int. Cl.
| | |
|---|---|
| *G06F 3/12* | (2006.01) |
| *H04N 1/327* | (2006.01) |
| *H04N 1/00* | (2006.01) |
| *H04N 1/32* | (2006.01) |

(52) U.S. Cl.
CPC ..... *H04N 1/32771* (2013.01); *H04N 1/00307* (2013.01); *H04N 1/00464* (2013.01); *H04N 1/32411* (2013.01); *H04N 2201/0094* (2013.01); *H04N 2201/3204* (2013.01); *H04N 2201/3205* (2013.01); *H04N 2201/3207* (2013.01);

(Continued)

(58) Field of Classification Search
None
See application file for complete search history.

(56) References Cited

U.S. PATENT DOCUMENTS

| | | | | |
|---|---|---|---|---|
| 6,801,340 | B1 * | 10/2004 | Endo .................. | G07B 17/0008 358/1.15 |
| 2003/0035141 | A1 * | 2/2003 | Ilda .................... | H04N 1/00209 358/1.15 |

(Continued)

FOREIGN PATENT DOCUMENTS

JP    4355639 B2    11/2009

*Primary Examiner* — Miya J Williams
(74) *Attorney, Agent, or Firm* — Rossi, Kimms & McDowell LLP (57) ABSTRACT

An information processing apparatus comprises: a holding unit that holds destination information as a data sending destination of a data sending apparatus; an obtaining unit that obtains data of a setting screen from the data sending apparatus; a determination unit that determines whether a program for displaying the destination information on the setting screen is included in the data of the setting screen obtained by the obtaining unit; a display unit that, based on that the determination unit determining that the program is included, obtains the destination information from the holding unit and selectably displays the destination information on the setting screen by executing the program; and a sending unit that sends the selected destination information to the data sending apparatus by accepting selection of the destination information via the setting screen displayed by the display unit.

5 Claims, 8 Drawing Sheets

(52) U.S. Cl.
CPC ............... *H04N 2201/3208* (2013.01); *H04N 2201/3209* (2013.01); *H04N 2201/3225* (2013.01)

(56) References Cited

U.S. PATENT DOCUMENTS

| | | | | |
|---|---|---|---|---|
| 2006/0112268 | A1* | 5/2006 | Kamiya | G06F 21/51 713/165 |
| 2008/0043282 | A1* | 2/2008 | Tsuboi | H04N 1/00204 358/1.15 |
| 2009/0103132 | A1* | 4/2009 | Ito | H04N 1/00204 358/1.15 |
| 2013/0250326 | A1* | 9/2013 | Kono | G06F 3/1204 358/1.13 |
| 2013/0250347 | A1* | 9/2013 | Kono | H04N 1/00204 358/1.15 |
| 2014/0146364 | A1* | 5/2014 | Matsumoto | H04N 1/00217 358/1.15 |
| 2014/0304591 | A1 | 10/2014 | Yamamoto | |
| 2016/0219161 | A1* | 7/2016 | Nakamura | H04N 1/00204 |

* cited by examiner

```
1    <!DOCTYPE html>
2    <html>
3        :
4    <script type="text/javascript" src="/js/mobile.js"></script>
5        :
6    <input type="text" id="address" name="address" size="35" maxlength="200">
7        :
8    </html>
```

FIG. 4

```
1    function addAddress(string)
2    {
3        :
4    }
```

INFORMATION PROCESSING APPARATUS AND CONTROL METHOD THEREFOR, AND NON-TRANSITORY COMPUTER-READABLE MEDIUM THAT OBTAINS AND SETS SEND DESTINATION INFORMATION USING A WEB BROWSER FUNCTION

BACKGROUND OF THE INVENTION

Field of the Invention

The present invention relates to an information processing apparatus and a control method therefor, a data sending apparatus and a control method therefor, and a non-transitory computer-readable medium.

Description of the Related Art

There is provided a function of digitizing a paper document into an image file by scanning it by the scanner of a digital multi-function peripheral, and sending the image file via a FAX line or network. At this time, the operation unit of the digital multi-function peripheral is used to enter the destination information of a sending destination such as a telephone number or email address. However, it is also possible to register destination information using the address book function of the digital multi-function peripheral to omit the labor to enter the destination information. If the user wants to set, as a sending destination, destination information saved in a smartphone, a PC, or the like which serves as a user terminal, he/she needs to re-register the destination information in the digital multi-function peripheral.

There is provided a method of using HTML (Hypertext Markup Language) data sent from the Web server of the digital multi-function peripheral when registering destination information. A Web browser on a PC displays the HTML data, the user enters destination information in a FORM element, and the Web browser sends the destination information to the Web server of the digital multi-function peripheral, thereby registering the destination information. If it is possible to enter, via the HTML data, destination information saved in the user terminal, it becomes unnecessary to re-register the destination information in the digital multi-function peripheral. For example, Japanese Patent No. 4355639 discloses a Web browser function embedded in a digital multi-function peripheral. The embedded Web browser makes it possible to obtain a user name, a product name, the model name of a unit, and the like from the multi-function peripheral and enter the obtained information in the Web browser by executing a script in the HTML data.

If the HTML data sent from the Web server of the digital multi-function peripheral is used to register destination information, it is a common practice that the Web browser on a client displays the HTML data, and the user manually enters destination information.

SUMMARY OF THE INVENTION

In this regard, the present invention provides a control method in which destination information held in a user terminal is automatically entered in HTML data provided from the Web server of a multi-function peripheral, and can then be readily selected as a sending destination on the Web browser of a client.

According to one aspect of the present invention, there is provided an information processing apparatus comprising: a holding unit configured to hold destination information as a data sending destination of a data sending apparatus; an obtaining unit configured to obtain data of a setting screen from the data sending apparatus; a determination unit configured to determine whether a program for displaying the destination information on the setting screen is included in the data of the setting screen obtained by the obtaining unit; a display unit configured to, based on that the determination unit determining that the program is included, obtain the destination information from the holding unit and selectably display the destination information on the setting screen by executing the program; and a sending unit configured to send the selected destination information to the data sending apparatus by accepting selection of the destination information via the setting screen displayed by the display unit.

According to another aspect of the present invention, there is provided a data sending apparatus comprising: an acceptance unit configured to accept, from an external apparatus, a request to send data; a providing unit configured to provide, to the external apparatus, data of a setting screen for accepting a setting associated with sending of the data in response to the request; and a processing unit configured to send the data to a sending destination using the setting associated with sending entered in the setting screen, wherein the data of the setting screen includes a program for selectably displaying destination information held in the external apparatus when the external apparatus displays the setting screen.

According to another aspect of the present invention, there is provided a control method for an information processing apparatus including a holding unit configured to hold destination information as a data sending destination of a data sending apparatus, the method comprising: obtaining data of a setting screen from the data sending apparatus; determining whether a program for displaying the destination information on the setting screen is included in the data of the setting screen obtained in the obtaining; selectably displaying the destination information on the setting screen by obtaining the destination information from the holding unit by executing the program, based on that it is determined in the determining that the program is included; and sending the selected destination information to the data sending apparatus by accepting selection of the destination information via the setting screen displayed in the selectably displaying.

According to another aspect of the present invention, there is provided a control method for a data sending apparatus, comprising: accepting, from an external apparatus, a request to send data; providing, to the external apparatus, data of a setting screen for accepting a setting associated with sending of the data in response to the request; and sending the data to a sending destination using the setting associated with sending entered in the setting screen, wherein the data of the setting screen includes a program for selectably displaying destination information held in the external apparatus when the external apparatus displays the setting screen.

According to another aspect of the present invention, there is provided a non-transitory computer-readable medium storing a program for causing a computer to functions as: a holding unit configured to hold, in a storage unit, destination information as a data sending destination of a data sending apparatus; an obtaining unit configured to obtain data of a setting screen from the data sending apparatus; a determination unit configured to determine whether a program for displaying the destination information on the setting screen is included in the data of the setting screen obtained by the obtaining unit; a display control unit configured to, based on that the determination unit determining that the program is included, obtain the destination information from the storage unit and cause a display unit to selectably display the destination information on the setting screen by executing the program; and a sending unit configured to send the selected destination information to the data sending apparatus by accepting selection of the destination information via the setting screen displayed by the display unit.

According to another aspect of the present invention, there is provided a non-transitory computer-readable medium storing a program for causing a computer to functions as: an acceptance unit configured to accept, from an external apparatus, a request to send data; a providing unit configured to provide, to the external apparatus, data of a setting screen for accepting a setting associated with sending of the data in response to the request; and a processing unit configured to send the data to a sending destination using the setting associated with sending entered in the setting screen, wherein the data of the setting screen includes a program for selectably displaying destination information held in the external apparatus when the external apparatus displays the setting screen.

According to the present invention, it is possible to display a content provided from a server and a content held in a client on the Web browser of the client.

Further features of the present invention will become apparent from the following description of exemplary embodiments (with reference to the attached drawings).

DESCRIPTION OF THE EMBODIMENTS

Embodiments of the present invention will be described below with reference to the accompanying drawings. Note that an MFP (Multi-Function Peripheral) having copy, scanner, facsimile, and printer functions will be exemplified as a data sending apparatus in the following description. The present invention, however, is not limited to this, and a data sending apparatus may be another apparatus with an arrangement of sending data from a single printer device.

First Embodiment

[System Configuration]

Figure 1:
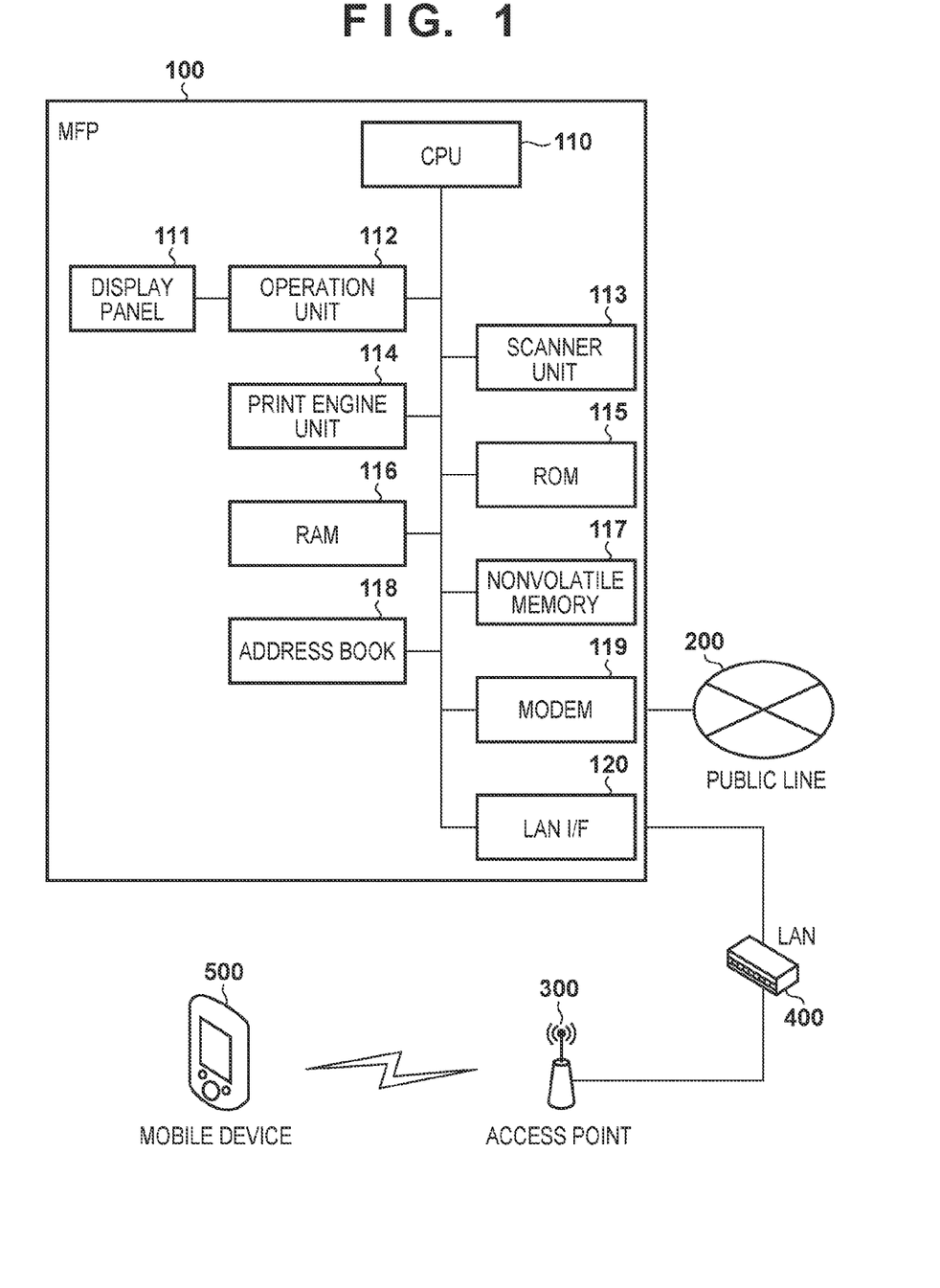
FIG. 1 is a block diagram showing an example of the configuration of a system according to the present invention.

FIG. 1 is a block diagram showing an example of the configuration of a system according to the present invention. An MFP 100 digitizes a paper document into an image file by scanning it by a scanner, and sends the image file via a FAX line or network. At this time, the MFP 100 can enter, as a sending destination, destination information such as a telephone number, FAX number, or email address. The MFP 100 includes a Web server (not shown) that sends, in response to a request, HTML data to which destination information can be entered.

A mobile device 500 connected to the MFP 100 via various networks includes a Web browser for displaying HTML data sent from the MFP 100. Furthermore, the mobile device 500 includes application software for entering, in the HTML data, destination information extracted from the address book of itself.

The MFP 100 includes modules denoted by reference numerals 110 to 120. The CPU 110 controls the overall MFP 100. The CPU 110 implements various functions by reading out various programs stored in the ROM 115 and the like, and executing them. The display panel 111 displays functions, settings, and the like. The operation unit 112 is used to send execution instructions of the various programs. The scanner unit 113 reads a document, and converts it into image data. The print engine unit 114 prints out the image data. The ROM 115 stores program codes for controlling the various functions. By using a rewritable flash ROM as the ROM 115, it is possible to update the program codes stored in the ROM 115.

The RAM 116 is used as a work memory for various program codes, and is also used to temporarily store an image to be printed out to the print engine unit 114. The nonvolatile memory 117 serves as a storage unit that temporarily stores an image to be printed out to the print engine unit 114, and stores the use history of the MFP 100. The nonvolatile memory 117 is implemented by a hard disk (HDD), a flash ROM, or the like. The address book 118 is the storage destination of destination information such as a telephone number or email address, which is used to send image data. The address book 118 is implemented by a hard disk (HDD), a flash ROM, or the like. The modem 119 is used to perform connection to a public line 200, and allows sending/reception of FAX data. The LAN I/F 120 is used to perform connection to a LAN (Local Area Network) 400, and allows sending/reception of print data.

The mobile device 500 is an information processing apparatus such as a smartphone, mobile phone, or tablet PC, and is connected to the LAN 400 via an access point 300 using a wireless LAN function. The mobile device 500 includes a Web browser (not shown). Note that although not shown in FIG. 1, the mobile device 500 includes a control unit for controlling itself, and a storage area. In addition to the Web browser, the mobile device 500 can execute a JavaScript® code included in an HTML content provided from the MFP 100, and an application program (not shown).

[Content]

Figure 2:
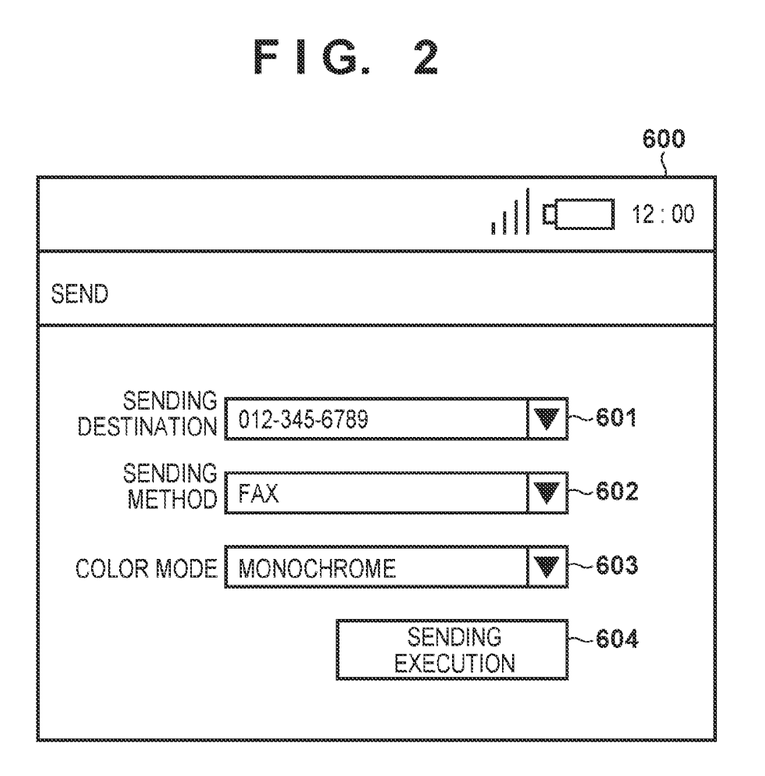
FIG. 2 is a view showing an example of the screen arrangement of an HTML content according to the present invention.

FIG. 2 shows an example of the screen arrangement of an HTML content sent by the Web server of the MFP 100 according to the present invention. An HTML screen 600 is a setting screen associated with the FAX function of the MFP 100, and includes, as setting items, an image sending destination setting 601, an image sending method setting 602, and a color mode setting 603. In the setting 602, for example, one of FAX, email, SMB (Server Message Block), and FTP (File Transfer Protocol) can be selected as an image sending method. In the setting 603, whether a color or monochrome image is to be sent can be selected.

The Web browser of the mobile device 500 obtains the resource of the HTML screen 600 from the MFP 100, and displays the screen. The user of the mobile device 500 sets the settings 601 to 603, and presses a sending execution button 604. This sends setting information designated in the settings 601 to 603 from the mobile device 500 to the Web server of the MFP 100 via an HTTP (Hyper Text Transfer Protocol) POST method. Note that a FAX sending instruction may be sent by pressing the sending execution button 604, or only the setting of the FAX function may be sent.

Upon receiving the POST method, the MFP 100 sends an image to the sending destination based on the setting information of the settings 601 to 603. Note that a method of selection from a list is adopted for the sending destination setting 601. However, the present invention is not limited to this, and destination information such as a telephone number, FAX number, or email address may be freely entered. If the selection method is adopted for the sending destination setting 601, it is assumed that the MFP 100 can generate an HTML content in which a sending destination stored in the address book 118 of the MFP 100 is set as an option. This embodiment, however, has as its feature that address book information (destination information) stored in the mobile device 500 is displayed as an option in the setting 601.

Figure 3:
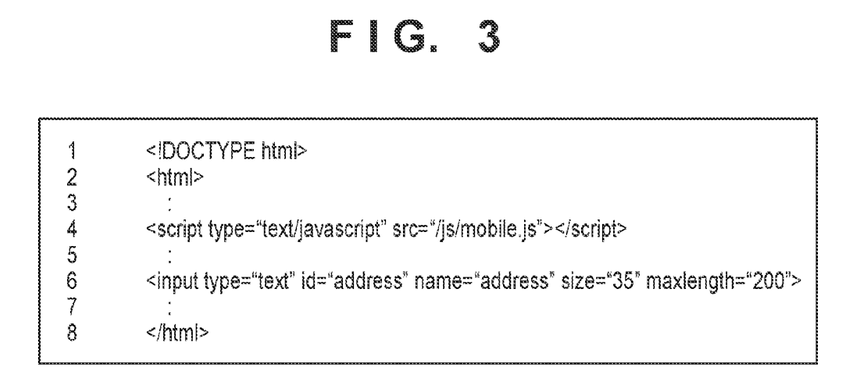
FIG. 3 is a view showing an example of data forming the HTML content according to the present invention.
Figure 4:
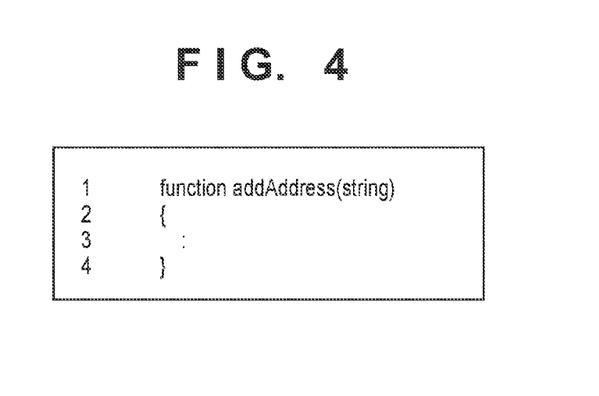
FIG. 4 is a view showing a sample of a JavaScript function according to the present invention.

FIG. 3 shows part of data forming the HTML content shown in FIG. 2 according to the present invention. In the HTML data, a script tag (<script>) on the fourth line can be used and described to load a script portion as an external file. This embodiment makes it possible to determine, using an src attribute "./js/mobile.js", that a script for entering, in the HTML content, the address book information stored in the mobile device 500 is stored. Assume that in the script "./js/mobile.js", a function shown in FIG. 4 is defined. Although details of described contents will be omitted, a telephone number, an email address, or the like is set as an argument of the function, and the telephone number or the email address set as the argument is used as an option of the sending destination setting 601 by calling the function.

If a plurality of telephone numbers or email addresses are stored in the address book of the mobile device 500, it is possible to process them as a plurality of options by calling the function a plurality of times. The mobile device 500 displays the screen shown in FIG. 2 based on the HTML file loaded by the Web browser function, and simultaneously detects the script tag and src attribute. At this time, if the mobile device 500 determines that a telephone number or email address can be entered, each character string shown in FIG. 5 is used as an argument to call the function shown in FIG. 4.

Figure 5:
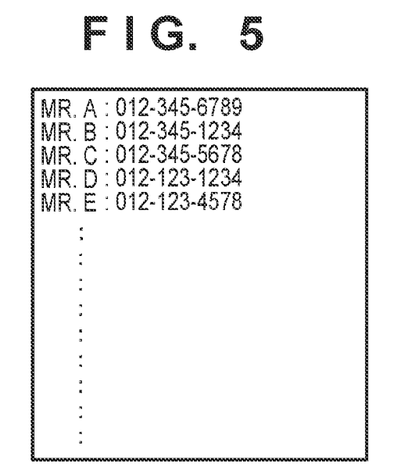
FIG. 5 is a view showing a sample of destination information entered in JavaScript data.

The address book shown in FIG. 5 is formed by respectively associating person's names with telephone numbers. However, the present invention is not limited to this, and the person's names may be associated with email addresses instead of the telephone numbers. With respect to the address book, character strings of a plurality of persons may be collectively entered as the argument of the function, or a character string of one person may be entered by calling the function a plurality of times. Assume that the address book shown in FIG. 5 is held in the storage unit (not shown) of the mobile device 500.

Figure 6:
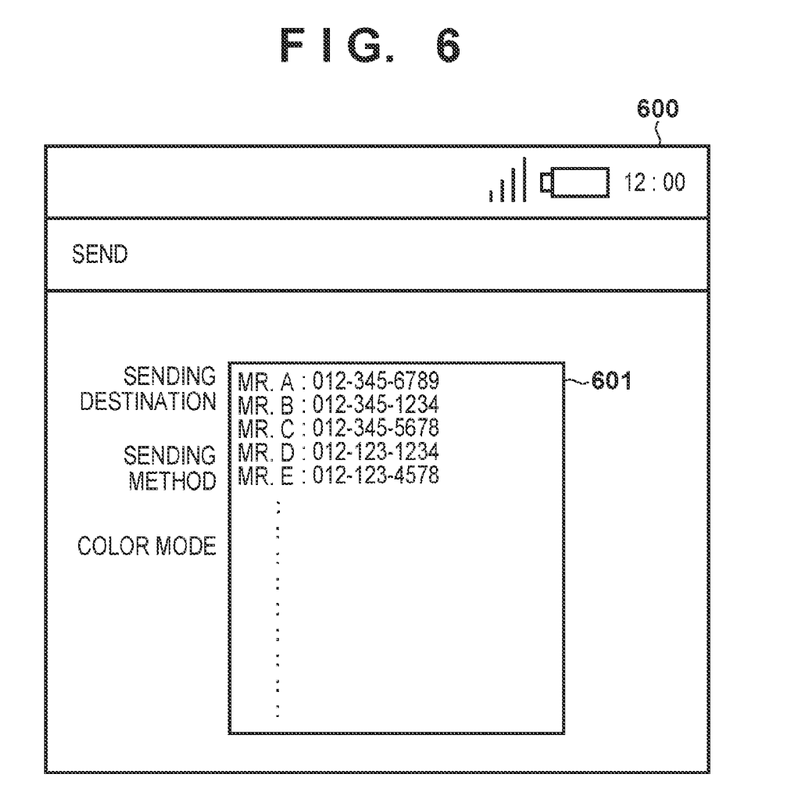
FIG. 6 is a view showing an example of the screen arrangement of an HTML content according to the present invention.

FIG. 6 shows an example of the screen display of an HTML content when the address book shown in FIG. 5 is entered according to the present invention. If the list display instruction portion of the sending destination setting 601 is pressed, a list of a plurality of person's names and their telephone numbers is displayed. The user can set a sending destination or sending destinations by selecting one or a plurality of persons from the displayed list.

Figure 7:
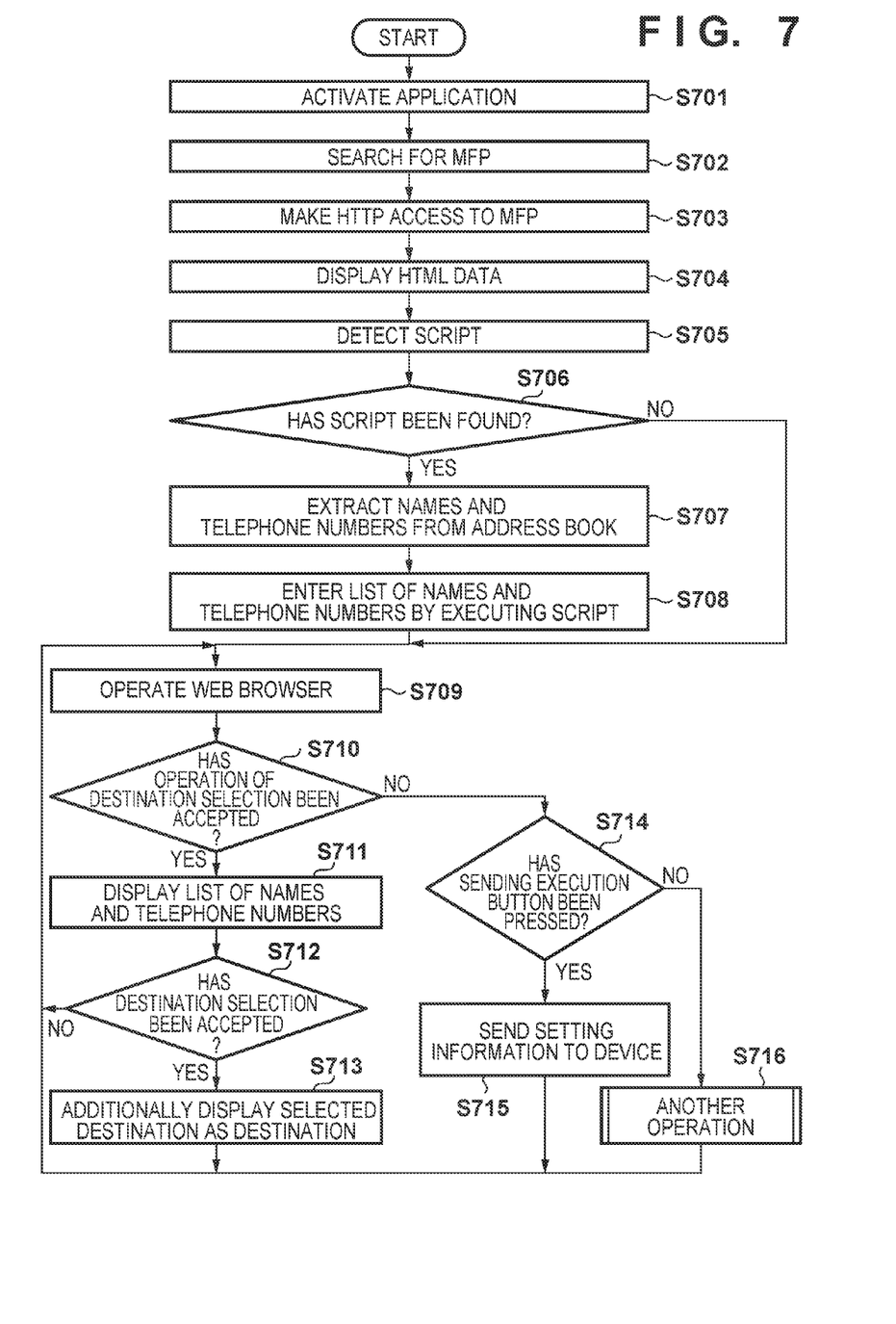
FIG. 7 is a flowchart illustrating destination information entry control according to the first embodiment.

FIG. 7 is a flowchart illustrating the operation of the mobile device 500 according to this embodiment. Since the MFP 100 is used from the mobile device 500, the operation of the flowchart starts when the mobile device 500 starts a device search. This processing procedure is implemented when the CPU of the mobile device 500 reads out a program stored in the storage unit, and executes it.

In step S701, the mobile device 500 activates installed application software (not shown). The application software has a function of searching for the MFP 100, and a Web browser function of obtaining and displaying HTML data via an HTTP GET method and the HTTP POST method.

In step S702, the activated application software searches for the useable MFP 100. In this embodiment, to search for the MFP 100, a search is performed using a short distance wireless communication technique such as NFC (Near Field Communication) or BLE (Bluetooth Low Energy). Alternatively, a search may be performed using a device monitoring protocol in a TCP/IP network by SNMP (Simple Network Management Protocol). A known technique is used for device search processing and a detailed description thereof will be omitted.

In step S703, the application software makes an HTTP access to the MFP 100 found in step S702, and sends an HTML data obtaining request.

In step S704, the application software displays, on the Web browser, HTML data which has been sent from the MFP 100 in response to the request sent in step S703.

In step S705, the application software detects whether the HTML data stores the script for entering a sending destination from the address book of the mobile device 500, as described with reference to FIG. 3. That is, the application software searches the HTML data obtained in step S703 for the script tag and src attribute. To execute a search, there is provided a method of detecting the script tag using, for example, a getElementsByTagName method of JavaScript®.

If no script has been detected (NO in step S706), the process advances to step S709. If the script of the src attribute "./js/mobile.js" has been detected (YES in step S706), the application software extracts data from the address book of the mobile device 500 in step S707.

In step S708, the application software enters information of the address book in the HTML data by executing the JavaScript function shown in FIG. 4.

In step S709, the application software accepts an operation from the user in the screen displayed in step S704.

In step S710, the application software determines whether a user operation of destination selection for the setting 601 has been accepted. If the setting of the sending destination setting 601 has been accepted (YES in step S710), the process advances to step S711; otherwise (NO in step S710), the process advances to step S714.

In step S711, the application software displays, as a destination list, the information of the address book entered in step S708.

In step S712, the application software determines whether a user operation as a selection operation from the destination list has been accepted. If a selection operation from the destination list has been accepted (YES in step S712), the process advances to step S713; otherwise (NO in step S712), the process returns to step S709.

In step S713, the application software sets the selected destination in the sending destination setting 601. Note that it is possible to set a plurality of selected sending destinations in the sending destination setting 601. After that, the process returns to step S709.

In step S714, the application software determines whether pressing of the sending execution button 604 has been accepted. If the sending execution button 604 has been pressed (YES in step S714), the process advances to step S715; otherwise (NO in step S714), the process advances to step S716.

In step S715, the application software sends the setting information set in the settings 601 to 603 to the MFP 100 via the HTTP POST method. After that, the process returns to step S709.

In step S716, the application software executes processing corresponding to the user operation. For example, if an operation for the color mode selection setting 603 has been performed, the setting is made. After that, the process returns to step S709.

According to this embodiment, destination information such as a telephone number or email address saved in the address book of a smartphone or PC is displayed in combination with an HTML content obtained from an MFP, and can be selected as an image sending destination. As a result, it is possible to eliminate manual entry to a data sending apparatus by the user when, for example, the data sending apparatus is used from a mobile terminal or the like, thereby improving the convenience.

Second Embodiment

In the first embodiment, a case in which the data of the address book of the mobile device 500 is entered in the HTML content provided by the MFP 100 has been explained. The second embodiment will describe a case in which when no function of entering data of an address book is included unlike the first embodiment, destination information is set via the entry screen of a mobile device 500.

Figure 8:
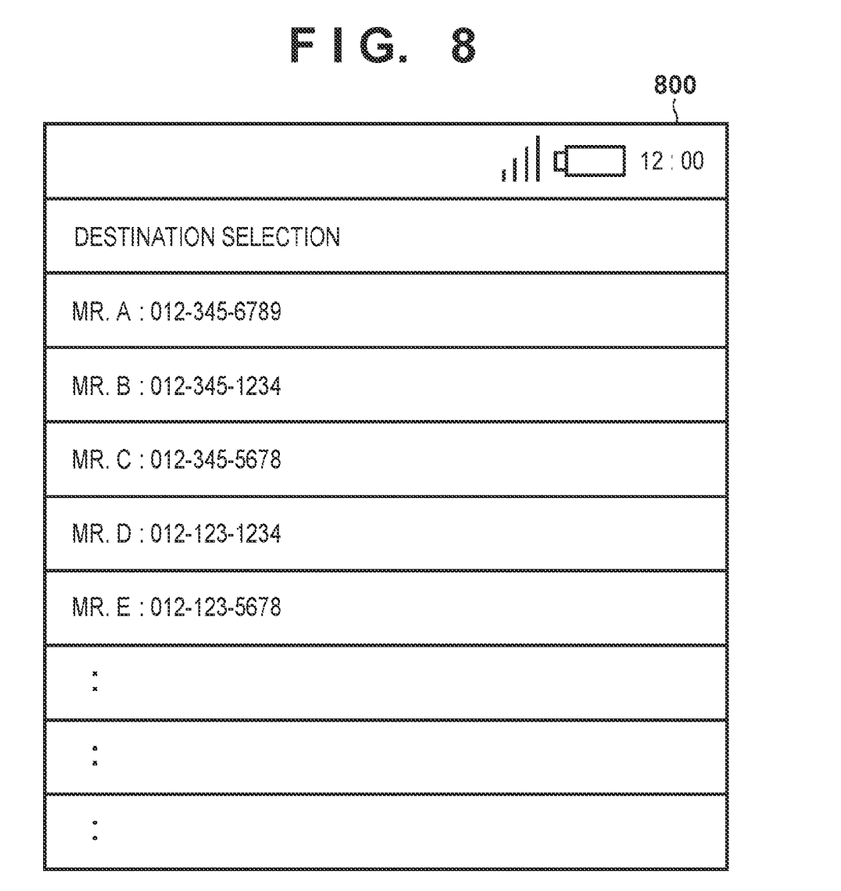
FIG. 8 is a view showing a sample of a destination information entry screen according to the present invention.

FIG. 8 shows an example of a sending destination entry screen 800 of the mobile device 500 according to this embodiment. Referring to FIG. 8, data is extracted from the address book of the mobile device 500, and a list of names and telephone numbers or email addresses is displayed. In this example, pieces of destination information are selectably displayed as sending destinations. If the user selects one or a plurality of sending destinations in the sending destination entry screen 800, the display is switched to an HTML screen 600 shown in FIG. 2, and the selected sending destination or destinations are set in a sending destination setting 601.

[Processing Procedure]

Figure 9A:
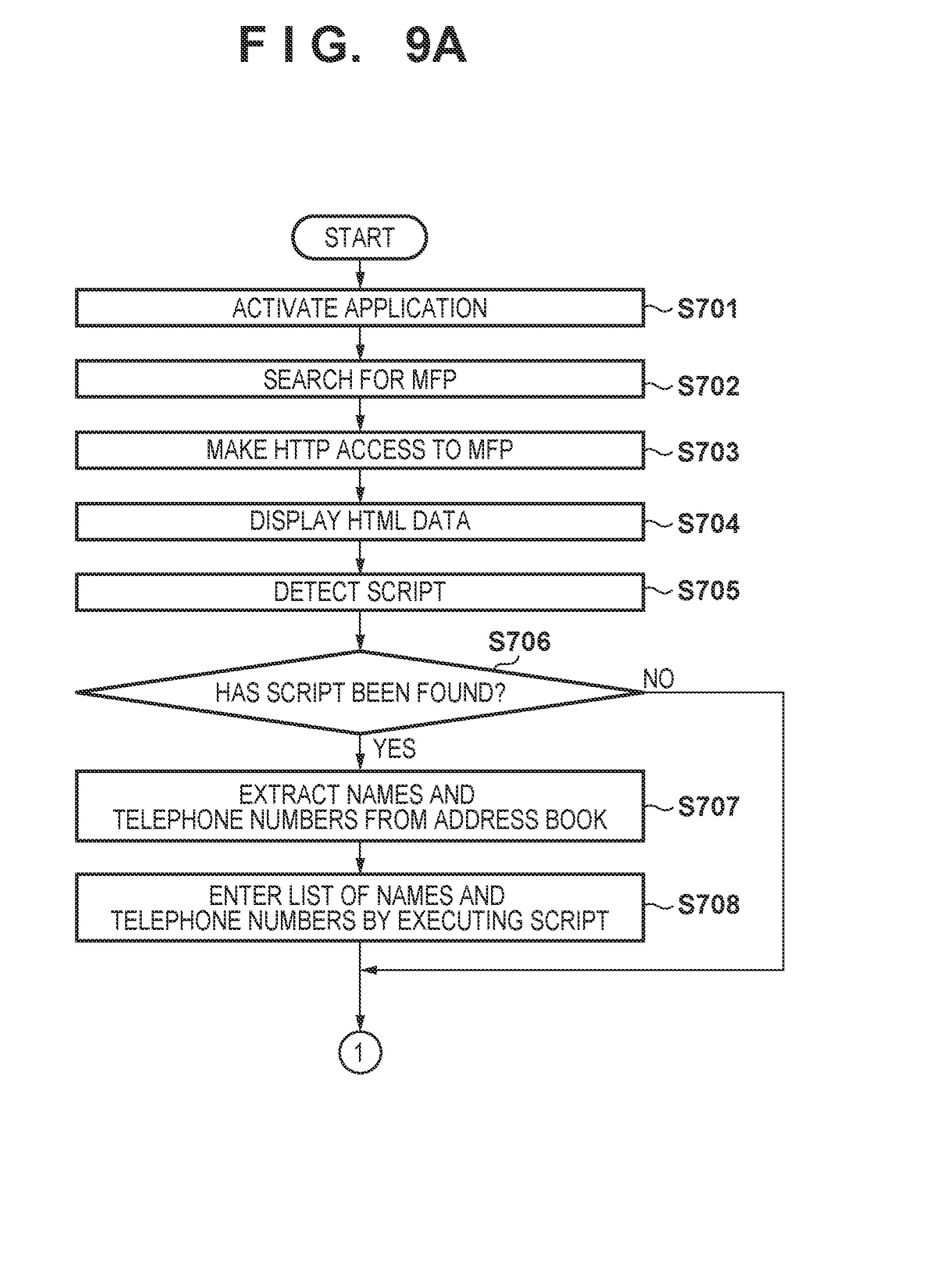
FIGS. 9A and 9B are flowcharts illustrating destination information entry control according to the second embodiment.
Figure 9B:
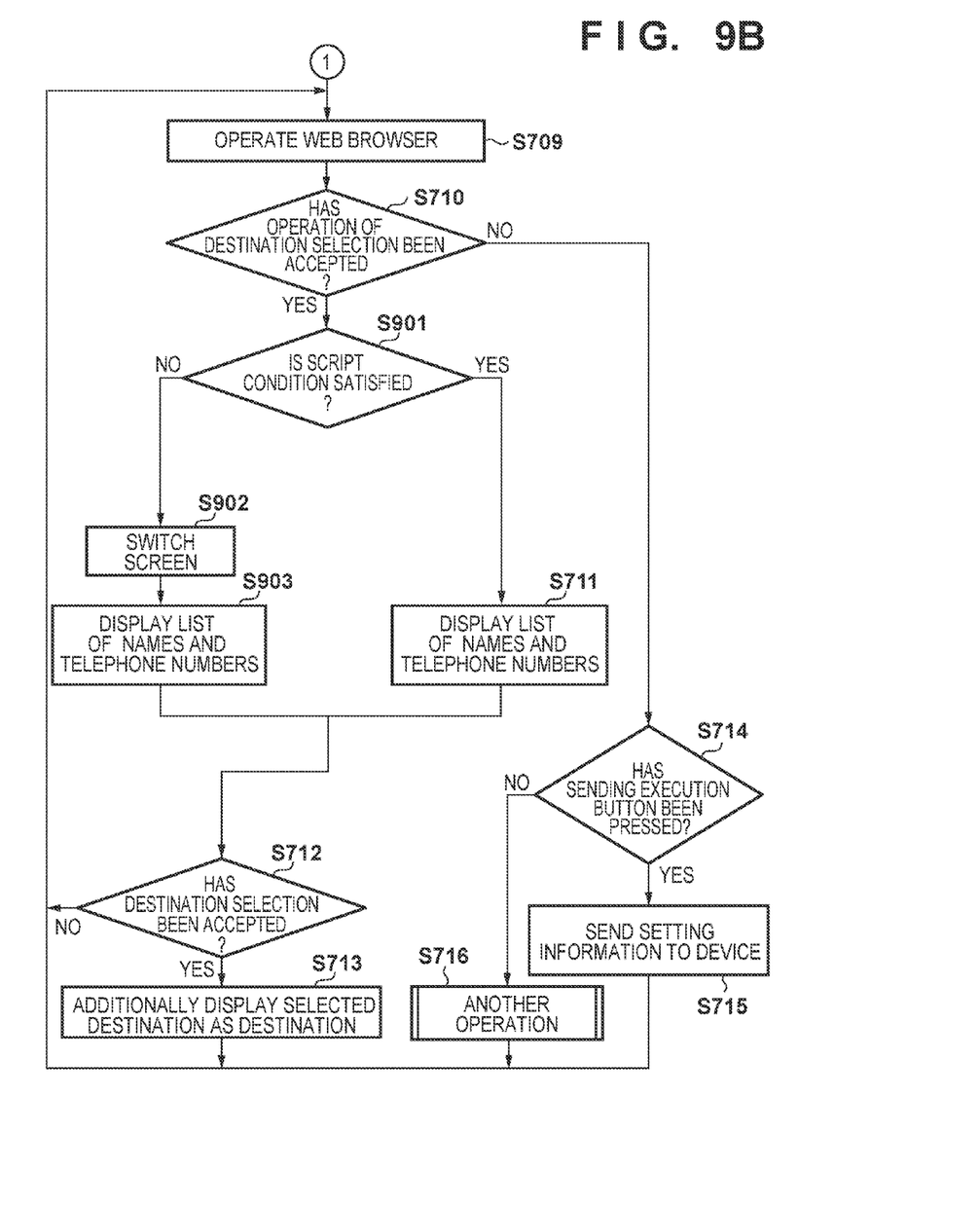

FIGS. 9A and 9B are flowcharts illustrating the operation of the mobile device 500 according to this embodiment. Operations in steps S701 to S713 are the same as those described in FIG. 7 and a detailed description thereof will be omitted.

The difference from FIG. 7 will be described.

If it is determined in step S710 that an operation of the sending destination setting 601 has been accepted (YES in step S710), the application software determines in step S901 whether a script has been detected in the processing in step S706. If no script has been detected (NO in step S901), the process advances to step S902; otherwise (YES in step S901), the process advances to step S711.

In step S902, the application software switches the display to the sending destination entry screen 800 shown in FIG. 8.

In step S903, the application software displays, as a list, the address book of the mobile device 500 via the sending destination entry screen 800. After that, the process advances to step S712.

Note that if no script has been detected, display may be performed so that it is possible to only directly enter data in the sending destination setting 601 of FIG. 2 instead of the method of selecting a telephone number or email address, without displaying the sending destination entry screen of FIG. 8.

As described above, in the second embodiment, it is possible to set destination information via the entry screen of the mobile device when no function of entering destination information via a script is included.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-082059, filed Apr. 13, 2015, which is hereby incorporated by reference herein in its entirety.

What is claimed is:

1. An information processing apparatus for communicating with an image sending apparatus, and including an application software having a web browsing function, the information processing comprising:
   a display device;
   a storage device storing an address book containing destination information used by the information processing apparatus, wherein the destination information includes at least a destination name and a send destination in association with each other; and
   at least one hardware processor configured to implement instructions for executing:
      an obtaining task that obtains, from the image sending apparatus, web contents data for performing a setting of a send function included in the image sending apparatus using the web browser function of the application software;

a setting displaying task that displays a setting screen in a predefined drawing region on the display device using the web browser function based on the obtained web contents data;
a determining task that determines whether or not the obtained web contents data includes a JavaScript for obtaining a send destination from the address book;
upon the determining task determining that the obtained web contents data includes the JavaScript for obtaining the destination from the address book:
   a destination obtaining task that obtains the destination information included in the address book stored in the storage device;
   an inserting task that inserts the obtained destination information in the web contents data by executing the JavaScript for obtaining the send destination within the address book using the web browser function; and
   a selection displaying task that, in response to receiving a user operation that a destination used by the image sending apparatus is set via the setting screen of the send function, displays a selection screen for setting the send destination used by the image sending apparatus, among a plurality of destinations, based on the destination information inserted in the web contents data, and receiving a setting of a destination used by the image sending apparatus via the selection screen;
upon the determining task determining that the obtained web contents data does not include the JavaScript for obtaining the send destination from the address book, in response to receiving a user operation that the send destination used by the image sending apparatus is set via the setting screen of the send function, a setting receiving task that receives a setting of the send destination used by the image sending apparatus, without displaying the selection screen, and allowing a user to directly input the send destination used by the image sending apparatus; and
a sending task that sends settings the send function, including the set destination, to the image sending apparatus.

2. A method of controlling an information processing apparatus for communicating with an image sending apparatus, the information processing apparatus having an application software having a web browsing function, an display device, and a storage device storing an address book containing destination information used by the information processing apparatus, wherein the destination information includes at least a destination name and a send destination in association with each other, the control method comprising:
   an obtaining step of obtaining, from the image sending apparatus, web contents data for performing a setting of a send function included in the image sending apparatus using the web browser function of the application software;
   a setting displaying step of displaying a setting screen in a predefined drawing region on the display device using the web browser function based on the obtained web contents data,
   a determining step of determining whether or not the obtained web contents data includes a JavaScript for obtaining a send destination from the address book;
   upon the determining step determining that that the obtained web contents data includes the JavaScript for obtaining a destination from the address book:
      a destination obtaining step of obtaining the destination information included in the address book stored in the storage device;
      an inserting step of inserting the obtained destination information and destination name in the web contents data by executing the JavaScript for obtaining the send destination within the address book using the web browser function; and
      a selection displaying step of, in response to receiving a user operation that a destination used by the image sending apparatus is set via the setting screen of the send function, displaying a selection screen for setting the send destination used by the image sending apparatus, among a plurality of destinations, based on the destination information inserted in the web contents data, and receiving a setting of a destination used by the image sending apparatus via the selection screen;
   upon the determining step determining that the obtained web contents data does not include the JavaScript for obtaining the send destination from the address book, in response to receiving a user operation that the send destination used by the image sending apparatus is set via the setting screen of the send function, receiving a setting receiving step of receiving a setting of the send destination used by the image sending apparatus, without displaying the selection screen, and allowing a user to directly input the send destination used by the image sending apparatus; and
   a sending step of sending settings of the send function, including the set destination, to the image sending apparatus.

3. A non-transitory computer-readable medium storing a program executable by a computer to execute a method of controlling an information processing apparatus for communicating with an image sending apparatus, the information processing apparatus having an application software having a web browsing function, an display device, and a storage device storing an address book containing destination information used by the information processing apparatus, wherein the destination information includes at least a destination name and a send destination in association with each other, the control method comprising:
   an obtaining step of obtaining, from the image sending apparatus, web contents data for performing a setting of a send function included in the image sending apparatus using the web browser function of the application software;
   a setting displaying step of displaying a setting screen in a predefined drawing region on the display device using the web browser function based on the obtained web contents data,
   a determining step of determining whether or not the obtained web contents data includes a JavaScript for obtaining a send destination from the address book;
   upon the determining step determining that that the obtained web contents data includes the JavaScript for obtaining a destination from the address book:
      a destination obtaining step of obtaining the destination information included in the address book stored in the storage device;
      an inserting step of inserting the obtained destination information and destination name in the web contents data by executing the JavaScript for obtaining the send destination within the address book using the web browser function; and a selection displaying step of, in response to receiving a user operation that a destination used by the image sending apparatus is set via the setting screen of the send function, displaying a selection screen for setting the send destination used by the image sending apparatus, among a plurality of destinations, based on the destination information inserted in the web contents data, and receiving a setting of a destination used by the image sending apparatus via the selection screen;

upon the determining step determining that the obtained web contents data does not include the JavaScript for obtaining the send destination from the address book, in response to receiving a user operation that the send destination used by the image sending apparatus is set via the setting screen of the send function, receiving a setting receiving step of receiving a setting of the send destination used by the image sending apparatus, without displaying the selection screen, and allowing a user to directly input the send destination used by the image sending apparatus; and a sending step of sending settings of the send function, including the set destination, to the image sending apparatus.

4. The non-transitory computer-readable medium according to claim 3, wherein the settings of the send function includes setting the send destination to be sent to the image sending apparatus using a POST function of a HTTP, in response to selecting a sending execution button displayed in the setting screen using the web browser function.

5. The non-transitory computer-readable medium according to claim 3, wherein:
- the set send destination is a send destination of a FAX, and
- the settings of the send function include at least the send destination of the FAX and a color mode used in sending the FAX.

* * * * *